(12) United States Patent
Linder et al.

(10) Patent No.: US 11,498,529 B2
(45) Date of Patent: Nov. 15, 2022

(54) APPARATUS AND METHOD FOR TREATING A VEHICLE SURFACE WITH A FLUID

(71) Applicant: Washtec Holding GmbH, Augsburg (DE)

(72) Inventors: Thomas Linder, Welden (DE); Ferdinand Conrad, Augsburg (DE)

(73) Assignee: WashTec Holding GmbH, Augsburg (DE)

( * ) Notice: Subject to any disclaimer, the term of this patent is extended or adjusted under 35 U.S.C. 154(b) by 1045 days.

(21) Appl. No.: 16/099,268

(22) PCT Filed: May 12, 2016

(86) PCT No.: PCT/EP2016/060703
§ 371 (c)(1),
(2) Date: Nov. 6, 2018

(87) PCT Pub. No.: WO2017/194125
PCT Pub. Date: Nov. 16, 2017

(65) Prior Publication Data
US 2020/0317164 A1 Oct. 8, 2020

(51) Int. Cl.
*B60S 3/06* (2006.01)
*A46B 11/06* (2006.01)
(Continued)

(52) U.S. Cl.
CPC ............... *B60S 3/063* (2013.01); *A46B 11/06* (2013.01); *A46B 13/003* (2013.01); *A46B 13/04* (2013.01);
(Continued)

(58) Field of Classification Search
CPC .... B60S 3/04; B60S 3/06; B60S 3/063; A46B 11/06; A46B 13/003; A46B 13/04
See application file for complete search history.

(56) References Cited

U.S. PATENT DOCUMENTS 3,939,521 A 2/1976 Clark
7,003,842 B1 * 2/2006 Favagrossa ............ A46B 11/06
  15/23
(Continued)

FOREIGN PATENT DOCUMENTS

DE 60017288 T2 12/2005
EP 1939057 A2 7/2008
WO 01/65971 A1 9/2001

OTHER PUBLICATIONS

International Search Report dated Jan. 4, 2017 for PCT/EP2016/060703 filed on May 12, 2016.
(Continued)

*Primary Examiner* — Jennifer C Chiang
(74) *Attorney, Agent, or Firm* — Paul D. Bianco; Gary S. Winer; Fleit Intellectual Property Law (57) ABSTRACT

An apparatus for treating a vehicle surface with a fluid has a rotation device pivotably mounted about an axis of rotation, and a fluid supply device disposed concentrically with respect to the rotation device and which has an inlet opening for the supply of fluid. The apparatus is characterized in that a groove is formed in the fluid supply device. The groove is fluidically connected to the inlet opening and extends in the circumferential direction with respect to the axis of rotation over a limited circumferential angle range of the fluid supply device. The rotation device has a plurality of separate fluid channels, each of which opens into openings. The openings are disposed such that irrespective of the angular position of the rotation device to the fluid supply device with respect to the axis of rotation, and at least one of the openings of the rotation device is fluidically connected to the groove of the fluid supply device.

15 Claims, 8 Drawing Sheets

(51) Int. Cl.
*A46B 13/00* (2006.01)
*A46B 13/04* (2006.01)
*B60S 3/04* (2006.01)

(52) U.S. Cl.
CPC . B60S 3/04 (2013.01); B60S 3/06 (2013.01); *A46B 2200/3046* (2013.01)

(56) References Cited

U.S. PATENT DOCUMENTS 10,772,416 B2 * 9/2020 Mayer ................... A46B 13/001
11,104,306 B2 * 8/2021 Auer ......................... B60S 3/06

OTHER PUBLICATIONS

Written Opinion for PCT/EP2016/060703 filed May 12, 2016.
International Preliminary Report on Patentability and Written Opinion dated Nov. 13, 2018 for PCT/EP2016/060703 filed on May 12, 2016.

* cited by examiner

APPARATUS AND METHOD FOR TREATING A VEHICLE SURFACE WITH A FLUID

FIELD OF THE INVENTION

The present invention relates to an apparatus for treating a vehicle surface with a fluid, having a rotation device which is pivotably mounted about an axis of rotation, and a fluid supply device which is disposed concentrically with respect to the rotation device and which has an inlet opening for the supply of fluid. Furthermore, the present invention also relates to a method for treating a vehicle surface with a fluid by means of such a treatment apparatus.

BACKGROUND OF THE INVENTION

It is known that vehicle surfaces can be cleaned by means of washing brushes of a car wash facility. In the course of such a treatment of the vehicle surface, washing elements of the washing brush are wetted with a washing fluid. The rotating brush subsequently cleans the vehicle surface in that the washing elements that are wetted with the washing fluid are wiped across the vehicle surface.

As a rule, the rotating washing brush is wetted by spraying washing fluid via nozzle assemblies from the outside onto the washing brush. This causes the washing elements of the washing brush to be wetted with the washing fluid. Wetting the washing elements in this manner, however, has the disadvantage that the washing elements are sometimes only insufficiently wetted. This has a negative effect on the cleaning result of the vehicle surface. In addition, it gives rise to the problem that dirt accumulates in the radially inner portion of the washing brush. The reason for this is that the washing fluid that is sprayed on from the outside only insufficiently reaches the inside of the washing brush, so that the core of the brush remains dry. The result is that the washing elements of the washing brush must be frequently replaced and cleaned.

To solve this problem, DE 600 17 288 T2 proposes an apparatus in which the washing brush is wetted from the inside over a 360° angle of extension. This is to ensure that the body of the cleaning brush is continuously and consistently wetted with washing fluid. However, the disadvantage of this washing brush is that the consumption of washing fluid is relatively high.

SUMMARY OF THE INVENTION

Thus, one aspect of the present invention relates to an apparatus of the type described above, which can be operated while consuming less washing fluid, and a method therefor.

Advantageous embodiments and refinements follow are also disclosed.

The apparatus according to the present invention is characterized in that a groove is formed in the fluid supply device, which groove is fluidically connected to the inlet opening and extends over a limited circumferential angular range of the fluid supply device in the circumferential direction with respect to the axis of rotation. In addition, the rotation device comprises a plurality of separate fluid channels, each of which opens into openings. These openings are disposed in such a manner that, irrespective of the angular position of the rotation device to the fluid supply device with respect to the axis of rotation, at least one of the openings of the rotation device is fluidically connected to the groove of the fluid supply device.

Thus, in the apparatus according to the present invention, fluid is transferred from the groove of the fluid supply device into the fluid channels of the rotation device which rotates during operation. Thus, the advantage, on the one hand, is that in any angular position of the rotation device, the supply of fluid to at least one fluid channel is ensured, since one or a plurality of the openings of the rotation device are always fluidically connected to the groove. The limited circumferential angular range over which the groove extends in the fluid supply device makes it possible to ensure, on the other hand, that fluid is not continuously supplied to all fluid channels of the rotating rotation device. The advantage of this arrangement is that it is possible to sequentially supply the fluid channels with fluid from the groove when the rotation device is rotating. In this manner, the treatment of the vehicle surface with the fluid can be more specifically targeted in that the fluid ejection can be controlled in such a manner that it takes place only where the fluid is needed. The advantage is that the fluid consumption during the treatment of the vehicle surface can be reduced.

In the context of this patent specification, a limited circumferential angular range with respect to the axis of rotation is defined to mean that the groove does not extend in a full circle of 360° about the axis of rotation, but only in a circumferential angular range less than 360°. The groove in the fluid supply device extends specifically over a segment of a concentric ring which is disposed about the axis of rotation.

In any angular position of the rotation device relative to the fluid supply device with respect to the axis of rotation, preferably at least one of the openings of the rotation device is fluidically connected to the groove and at least another one of the openings of the rotation device is not fluidically connected to the groove.

The fluid involved is especially a washing or cleaning fluid. For example, the fluid can be a fluid mixture of water and a chemical compound that is suitable for cleaning a vehicle surface. However, the fluid used can also be a drying or cleaning gas.

If the apparatus is designed for washing a vehicle surface, for example, in a car wash facility, treatment or washing elements can be attached to the rotation device. In that case, the washing elements are radially mounted on the inside of the rotation device. The other end of the washing elements can extend radially outwardly away from the rotation device. In that case, for example, a washing brush is formed. However, the washing elements can also be cloth, yarn or the like.

The rotation device preferably has an elongated shape, with the lengthwise direction extending parallel to the axis of rotation. For example, the rotation device has a cylindrical shape, with the axis of rotation preferably coinciding with the axis of the cylinder.

According to one apparatus described by the present invention, each fluid channel connects the associated opening of the rotation device to a plurality of outlet openings which, in the lengthwise direction of the rotation device, are disposed at a distance from each other. Each of the outlet openings of one fluid channel is disposed at essentially the same circumferential angle of the rotation device, and the outlet openings of another fluid channel are disposed at a circumferential angle of the rotation device different from that of the outlet opening of the one fluid channel. Thus, each fluid channel is associated with a plurality of outlet openings, all of which are disposed essentially at the same circumferential angle of the rotation device. Thus, when at a specific angular position of the rotation device relative to the fluid supply device, fluid is supplied via the groove to the fluid channel, this fluid is ejected at a specific circumferential angle of the rotation device. When fluid is supplied via the groove to a plurality of fluid channels, the fluid is ejected only through the outlet openings of these fluid channels. In that case, the fluid is ejected within a limited circumferential angular range of the rotation device.

The outlet openings of a specific fluid channel are disposed at essentially the same circumferential angle, that is, the angle over which the outlet openings of this specific fluid channel can extend, are positioned, for example, within a range of 0° to 10°. However, the outlet openings of a specific fluid channel are disposed at the same circumferential angle of the rotation device.

Looking at a cross section through the rotation device in a plane orthogonal to the axis of rotation, in which cross section an outlet opening of a fluid channel is disposed, the outlet openings of various fluid channels in this section, in the circumferential direction with respect to the axis of rotation, are preferably disposed at equal distances from each other on the circumference of the rotation device. Thus, the fluid channels, which are fluidically connected to the groove only at specific angular positions of the rotation device relative to the fluid supply device, transform the extension of the groove of the fluid supply device over a limited circumferential angular range into a limited angular range into which fluid is ejected outwardly via the outlet openings. Thus, this limited angular range for the fluid discharge is fixedly associated with the angular position of the groove, even if the rotation device is rotating relative to the fluid supply device. The reason for this is that between the groove and the openings of the fluid channels, a sequential rotary valve control system forms, which ensures that fluid is ejected only within a specific limited angular range. However, because of the rotation of the rotation device, this fluid ejection is always triggered by other fluid channels and their outlet openings, so that fluid is radially ejected from the inside out over the entire circumference of the rotation device. This is of advantage especially if treatment elements are attached to the rotation device. In that case, the treatment elements are radially fully supplied with fluid from the inside out. This is of advantage especially if the fluid involved is a washing fluid. In that case, the treatment elements are fully wetted from the inside out with washing fluid. As a result, the advantage is that an accumulation of dirt in the radially inner portion of the treatment elements is prevented. At the same time, however, the consumption of washing fluid is reduced in that washing fluid is ejected only within a limited angular range.

According to a preferred refinement of the apparatus according to the present invention, the fluid supply device comprises an outer ring which has a rotationally symmetrical or, more specifically, a circular cylindrical, interior wall. In that case, the groove is formed in the rotationally symmetrical interior wall. More specifically, the groove is a recess in the interior wall. In a segment of the circle, it is formed within a limited circumferential angular range, which means that it is not formed along the entire circumference of 360°. The fluid supply from the inlet opening can be implemented, for example, by means of a radial bore from the inlet opening to the groove. Using an outer ring for the fluid supply makes it possible to manufacture the fluid supply device very simply and cost-effectively. In addition, it also offers advantages in terms of production technology during manufacture of the connection to the rotating rotation device.

In the rotationally symmetrical interior wall of the outer ring, the groove extends especially over a circumferential angle which is in a range of 20° to 180°. By means of the circumferential angular range of the groove, it can be determined how many fluid channels of the rotation device are simultaneously supplied with fluid. Thus, by means of this range, it is ultimately possible to determine within which angular range the fluid is ejected via the outlet openings. To this end, the circumferential angular range of the groove is selected, on the one hand, to ensure that the treatment of the vehicle surface yields optimum results. On the other hand, the circumferential angular range is limited in such a manner that the fluid consumption is only as high as necessary. To this end, the circumferential angular range of the groove can preferably be in a range of 30° to 140°, more preferably in a range of 80° to 130°. Most preferably, however, the circumferential angle extends over a range of 90° to 120°.

According to another embodiment of the apparatus according to the present invention, the rotation device comprises an inner ring, which has a rotationally symmetrical or, more specifically, a circular cylindrical exterior wall which adjoins the rotationally symmetrical or, more specifically, the circular cylindrical interior wall of the outer ring. In that case, the openings of the rotation device are disposed in the circumferential direction on the rotationally symmetrical exterior wall. This type of connection of the inner ring to the outer ring acts as a sequential rotary valve control system which sequentially supplies different subsets of the fluid channels of the rotation device with fluid. In terms of construction technology, the rotationally symmetrical or, more specifically, the circular cylindrical embodiments of the exterior wall of the inner ring and the interior wall of the outer ring make it possible to create a very simple connection between the inner ring and the outer ring, which allows the inner ring to rotate relative to the outer ring. The adjoining surfaces of the inner and the outer ring can also have the shape of a cone or, more specifically, of a conical shell.

Especially along the rotationally symmetrical adjoining surfaces, the inner ring and the outer ring are sealed off against one another in such a manner that fluid flowing or pouring from the groove into the fluid channels cannot leak to the outside. To this end, for example, rotary seals are inserted between the inner ring and the outer ring.

According to yet another embodiment of the apparatus according to the present invention, each fluid channel extends radially from the associated opening inwardly into the inner ring. Subsequently, each fluid channel extends in the lengthwise direction of the rotation device to the outlet openings. Thus, the inner ring can comprise a plurality of radial bores which are spaced apart from each other in the circumferential direction and which form the openings, which, depending on the angular position of the rotation device, are fluidically connected to the groove of the fluid supply device. In addition, it is possible to provide bores, which run parallel to the axis of rotation of the rotation device and which, in the inner ring, open into the radial bores. In this manner, sections of the fluid channels that are separated from each other are formed in the inner ring. In the lengthwise direction, these fluid channels can subsequently be extended in the rotation device up the outlet openings.

According to yet another embodiment of the apparatus according to the present invention, the rotation device comprises a brush shaft and a brush ring assembly. In this case, the brush ring assembly is disposed concentrically with respect to, on the outside of, and torsionally rigidly in one piece with the brush shaft. In addition, treatment elements, in particular brush elements, are attached to the brush ring assembly. In this case, each fluid channel comprises a section which extends within the inner ring and a section which extends within the brush ring assembly. The outlet openings are formed in the brush ring assembly. In this embodiment, the advantage is that the brush shaft can transmit the torque of the motor to the rotation device. By contrast, the brush ring assembly which is torsionally rigidly mounted on the brush shaft provides the fluid channels and the outlet openings. Thus, the brush ring assembly can be made of a material different from that of the brush shaft. The brush shaft is made, for example, of a metal, in particular of extruded aluminum, and the brush ring assembly is made of a plastic material. The treatment elements extend especially radially away from the brush ring assembly. These elements are supplied with fluid from the inside out via the outlet openings of the brush ring assembly. If the fluid involved is a washing fluid, the treatment elements are wetted from the inside out with the washing fluid. This ensures that the treatment elements are fully wetted. In addition, an accumulation of dirt in the radially interior portion of the treatment elements is avoided.

According to another refinement of the apparatus according to the present invention, the outlet openings are designed so that fluid is sprayed in a fluid jet in a spatial angle which is in a range of 0° to 100°, especially in a range of 0° to 15°. As an alternative or in addition thereto, the center line of the sprayed fluid jet forms an angle with the axis of rotation, which angle is in a range of 40° to 90°. An angle of 90° means that the fluid jet exits at right angles with respect to the axis of rotation, i.e., it exits radially. This angle is used especially in apparatuses for treating the roof of a vehicle. If predominantly vertical vehicle surfaces are treated, the angle is smaller than 90°, i.e., the jet is directed obliquely downwardly.

The size of the spatial angle can depend on the spacing between the outlet openings and on the type of treatment of the vehicle surface. Thus, the fluid jet can be ejected at right angles with respect to the axis of rotation or obliquely with respect to the axis of rotation. In the outlet openings, for example, nozzles can be disposed, by means of which nozzles the ejection of fluid can be controlled. As an alternative, the outlet openings are formed by bores which are oriented at right angles or obliquely with respect of the axis of rotation in the rotation device.

The brush ring assembly can comprise a plurality of brush ring segments which, in the lengthwise direction of the rotation device, are attached to the brush shaft and which are connected to each other. Each of the brush ring segments comprises sections of the fluid channels. To connect the individual brush ring segments, the fluid channels can be provided with connecting pieces which allow the fluid to pass from one brush ring segment to another brush ring segment without any leakage of fluid.

According to yet another embodiment of the apparatus according to the present invention, the inner ring and the outer ring are made of the same material, especially of a plastic material. This has the advantage that the inner ring and the outer ring have the same coefficients of thermal expansion, so that leakage of fluid from the passage of the fluid from the groove of the outer ring into the fluid channels of the inner ring can be avoided even when the temperature fluctuations are high. Another advantage is that producing the inner ring and the outer ring from a plastic material is extremely cost-effective.

According to another refinement of the apparatus according to the present invention, the rotation device is torsionally rigidly connected to at least one metal liner, which is attached to a motor shaft and which is engaged in the inner ring. Especially if the inner ring is made of a plastic material, during rotation of the inner ring, the forces of the motor shaft can be transmitted by the metal liner to the inner ring.

According to another refinement of the apparatus according to the present invention, the angular position of the fluid supply device can be adjusted with respect to the axis of rotation. The angular position of the fluid supply device determines the angular position of the groove. This position in turn determines in which angular position of the rotation device fluid is supplied from the groove to the fluid channels. This in turn determines within which angular range the fluid exits from the outlet openings relative to a stationary external system of coordinates. Thus, by means of the angular position of the fluid supply device, it can be specified in which direction the fluid is ejected to the outside. The fact that the angular position of the fluid supply device can be changed therefore makes it possible to accurately ensure that the fluid impacts a vehicle surface in the manner desired. Thus, the result of the treatment can be improved and the fluid consumption can be reduced.

The method according to the present invention for treating a vehicle surface with a fluid by means of a treatment apparatus that comprises a rotation device, which is pivotably mounted about an axis of rotation and which has separate fluid channels, and a fluid supply device, which is concentrically disposed with respect to the rotation device, includes the following steps: Fluid is supplied via an inlet opening to the fluid supply device. In the fluid supply device, the fluid is conducted from the inlet opening into a groove, which is fluidically connected to the inlet opening and which, in the circumferential direction with respect to the axis of rotation, extends over a limited circumferential angular range of the fluid supply device. The fluid is supplied to the rotating rotation device, with the fluid being supplied from the groove to a subset of the fluid channels and with openings of the fluid channels being disposed in such a manner that, irrespective of the angular position of the rotation device to the fluid supply device with respect to the axis of rotation, at least one opening is fluidically connected to the groove of the fluid supply device.

The method according to the present invention can be implemented especially by means of the apparatus described above. Therefore, the method also has the same advantages as the apparatus.

According to one embodiment of the method according to the present invention, the fluid is supplied from one of the fluid channels to a plurality of outlet openings of the rotation device and is ejected, especially radially ejected, from the outlet openings. In the lengthwise direction of the rotation device, the outlet openings of a fluid channel are disposed at a distance from each other, with the outlet openings of one fluid channel being disposed at essentially the same circumferential angle of the rotation device and with the outlet openings of another fluid channel being disposed at a circumferential angle of the rotation device different from the angle of the outlet openings of the one fluid channel. Thus, in the method according to the present invention, the angular position of the groove of the fluid supply device determines the circumferential angle, or more specifically, the circumferential angular range, within which the fluid is ejected. The advantage is that the fluid ejection with respect to the circumferential angle can therefore be limited, which allows a more effective and less expensive treatment of the vehicle surface.

According to another embodiment of the method according to the present invention, the angular position of the treatment apparatus is detected relative to a vehicle surface to be cleaned. The angular position of the groove of the fluid supply device is then adjusted with respect to the axis of rotation as a function of the determined angular position of the treatment apparatus relative to the vehicle surface to be cleaned. For example, the vehicle surface can be the surface of a vehicle which is stationed in a car wash facility. In that case, the position of the treatment apparatus relative to the vehicle surface to be cleaned changes. By changing the angular position of the groove, it is also possible to adjust the circumferential angle for the ejection of the fluid in such a way that the fluid is always ejected in the direction of the vehicle surface, even if the position of the treatment apparatus relative to the vehicle changes. This can also reduce fluid consumption and improve the treatment result.

BRIEF DESCRIPTION OF THE DRAWINGS

The invention will be explained based on an embodiment example with reference to the drawings.

DETAILED DESCRIPTION OF THE INVENTION

The embodiment example of the treatment apparatus 1 according to the present invention will be explained below with reference to FIGS. 1 to 5. The treatment apparatus 1 of this embodiment example is an apparatus for cleaning a vehicle surface. Thus, the fluid which is ejected by the treatment apparatus 1 is a washing fluid. However, the treatment apparatus 1 can also serve different functions, so that instead of a washing liquid, a gas, for example, air can be ejected.

The treatment apparatus 1 comprises a brush shaft 2. The brush shaft 2 is made of metal, for example, aluminum. This shaft has an elongated cylindrical shape and is pivotably mounted. In the radial direction, the brush shaft 2 comprises recesses, which can be engaged by other devices, thereby allowing the brush shaft 2 to transmit a torque when it is set in rotation.

Figure 2:
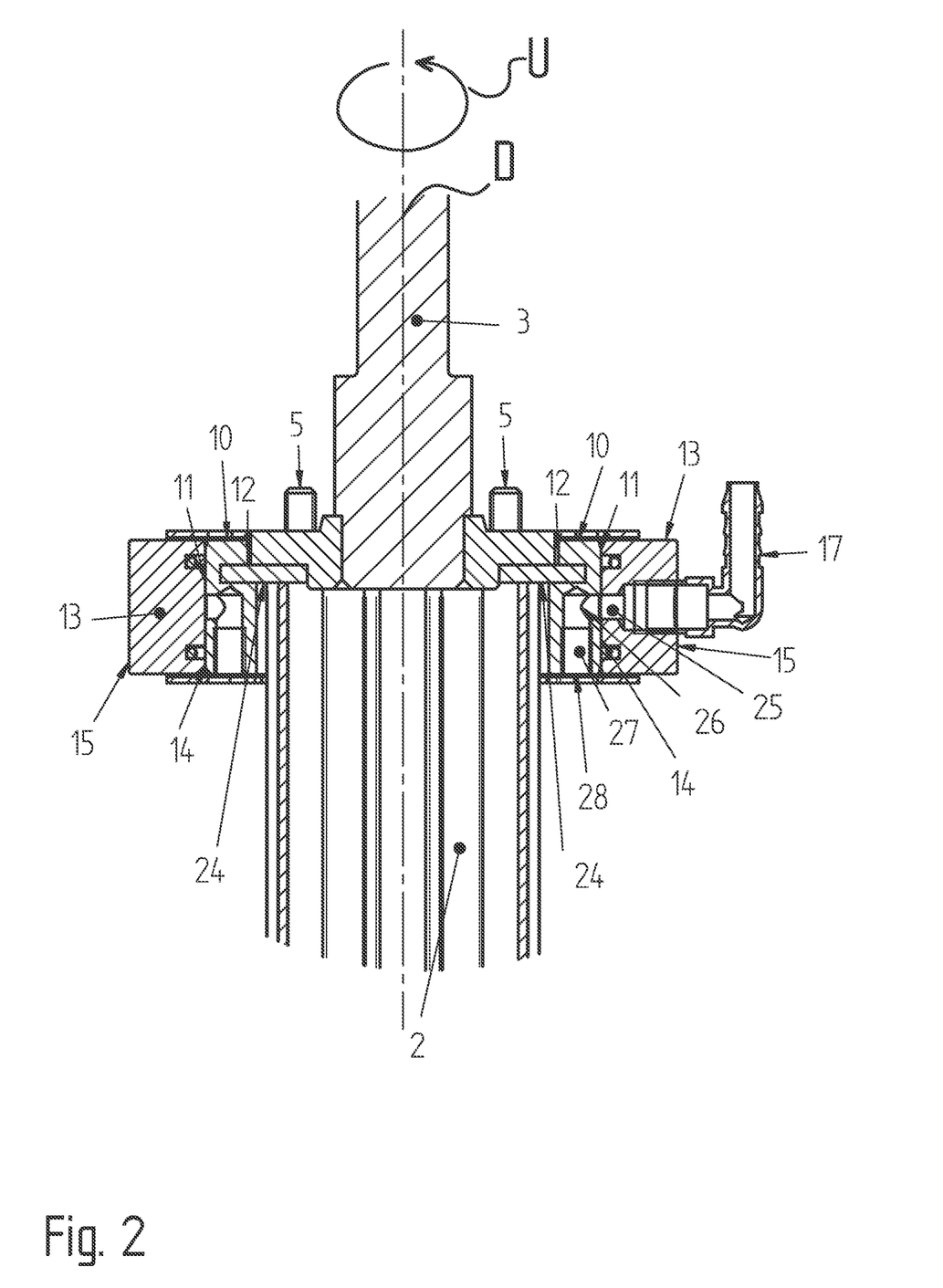
FIG. 2 shows a longitudinal section through a portion of the treatment apparatus shown in FIG. 1.

The brush shaft 2 is torsionally rigidly connected to a motor shaft 3 of a motor 4. As shown in FIG. 2, the brush shaft 2 can be connected to the motor shaft 3, for example, by means of screws 5.

Figure 4:
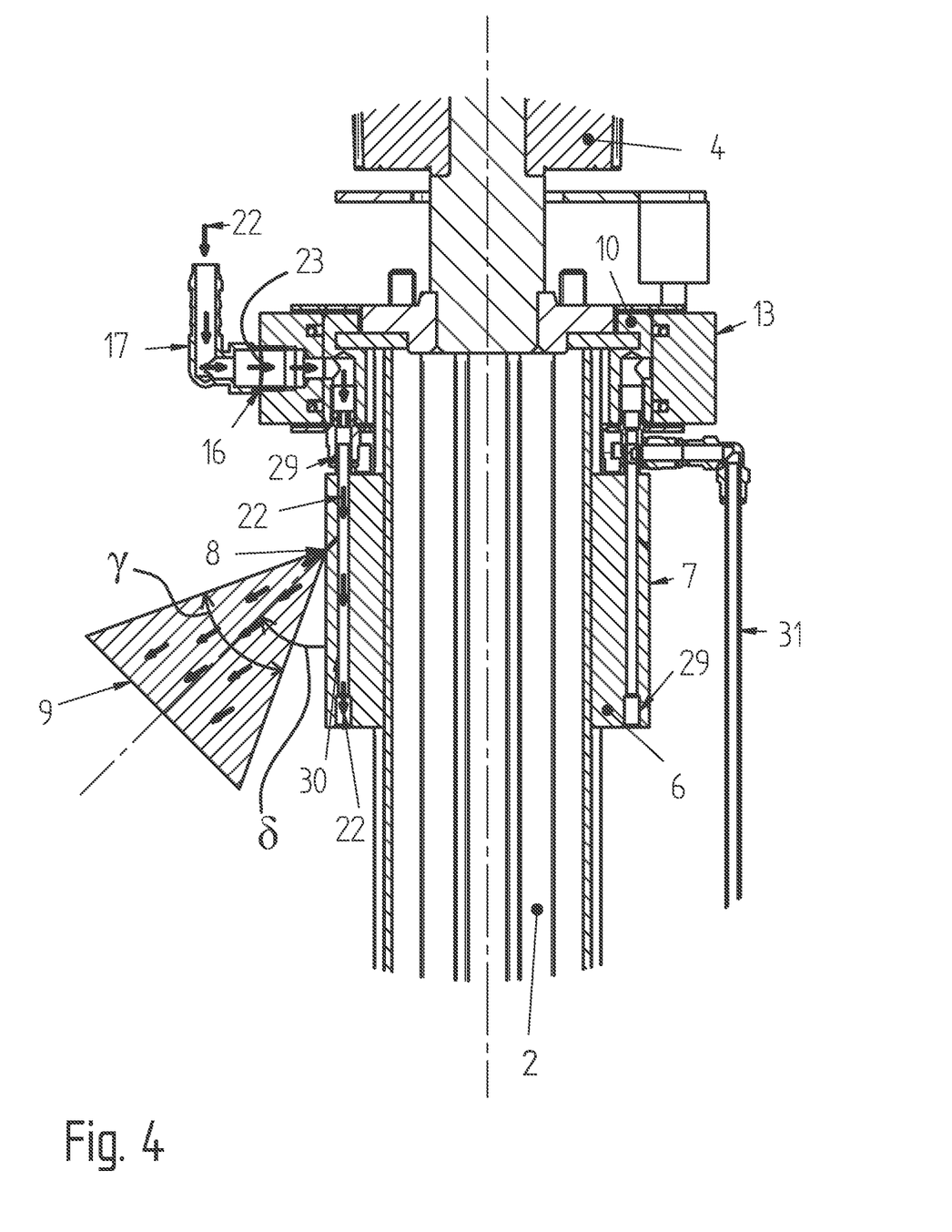
FIG. 4 shows a longitudinal section through the embodiment example of the treatment apparatus according to the present invention shown in FIG. 1, in which the flow of the fluid is illustrated.

A brush ring assembly 6 is torsionally rigidly connected to the brush shaft 2. With respect to the axis of rotation D of the brush shaft 2, the brush ring assembly 6 is concentric relative to the brush shaft 2. The brush ring assembly 6 is engaged in the recesses of the brush shaft 2, so that a rotation of the brush shaft 2 is transmitted to the brush ring assembly 6. In the lengthwise direction, the brush ring assembly 6 is subdivided into a plurality of brush ring segments 7, which is shown in FIG. 4.

The brush ring assembly 6 comprises a plurality of outlet openings 8. Via the outlet openings 8, a fluid jet 9 is ejected. To this end, for example, a nozzle can be disposed in each outlet opening 8. As shown in FIG. 4, the fluid is ejected within a spatial angle of size γ, with the center line of the fluid jet 9 forming an angle δ with the axis of rotation D. In the current embodiment example, the angle γ measures approximately 50°. However, this angle can also be much smaller, e.g., 0° or 15°, and can be customized in any way to the requirements of the treatment apparatus 1. In the current embodiment example, the angle δ measures 45°. However, the fluid can also be ejected at right angles to the axis of rotation. In that case, the angle δ measures 90°. However, in this case again, the angle δ can also be different, so as to customize the ejection of the fluid to the requirements of the treatment apparatus 1.

The brush shaft 2 and the motor shaft 3 are connected to an inner ring 10. With respect to the axis of rotation D, the inner ring 10 is disposed concentrically relative to the brush shaft 2. It has an interior wall 12 which adjoins the exterior wall of the brush shaft 2. In addition, the inner ring 10 has a rotationally symmetrical exterior wall 11. In the current embodiment example, the exterior wall has a circular cylindrical shape.

The inner ring 10 is made of a plastic material. To ensure a secure, torsionally rigid connection of the inner ring 10 to the motor shaft 3 or, more specifically, to the brush shaft 2, metal liners 24 are provided, which are attached to the motor shaft 3 or, more specifically, to the brush shaft 2 by means of the screws 5. Furthermore, as indicated in FIG. 2, the metal liners 24 are engaged in recesses of the inner ring 10. In this manner, the inner ring 10 is torsionally rigidly connected to the motor shaft 3, thereby ensuring that said inner ring is able to rotate with the motor shaft 3. Thus, the inner ring 10, the brush shaft 2 and the brush ring assembly 6 form an elongated rotation device which is pivotably mounted about the axis of rotation D.

An outer ring 13 is disposed concentrically with respect to the inner ring 10. The outer ring 13 has a rotationally symmetrical interior wall 14, which, in the current embodiment example, has a circular cylindrical shape and which closely adjoins the circular cylindrical exterior wall 11 of the inner ring 10. In addition, the outer ring 13 has an exterior wall 15, which, in the current embodiment example, also has a circular cylindrical shape. In the exterior wall 15 of the outer ring 13, an inlet opening 16 for a fluid is provided. In the current embodiment example, this inlet opening 16 is fitted with a hose coupling connector 17, to which a hose for supplying a fluid can be connected.

In a rotating rotation device, i.e., in a device with a rotating inner ring 10, the outer ring 13 is stationarily retained by the fixing elements 18. However, as will be explained below, these fixing elements 18 allow the angular position of the outer ring 13 to be changed with respect to the axis of rotation D.

Figure 5:
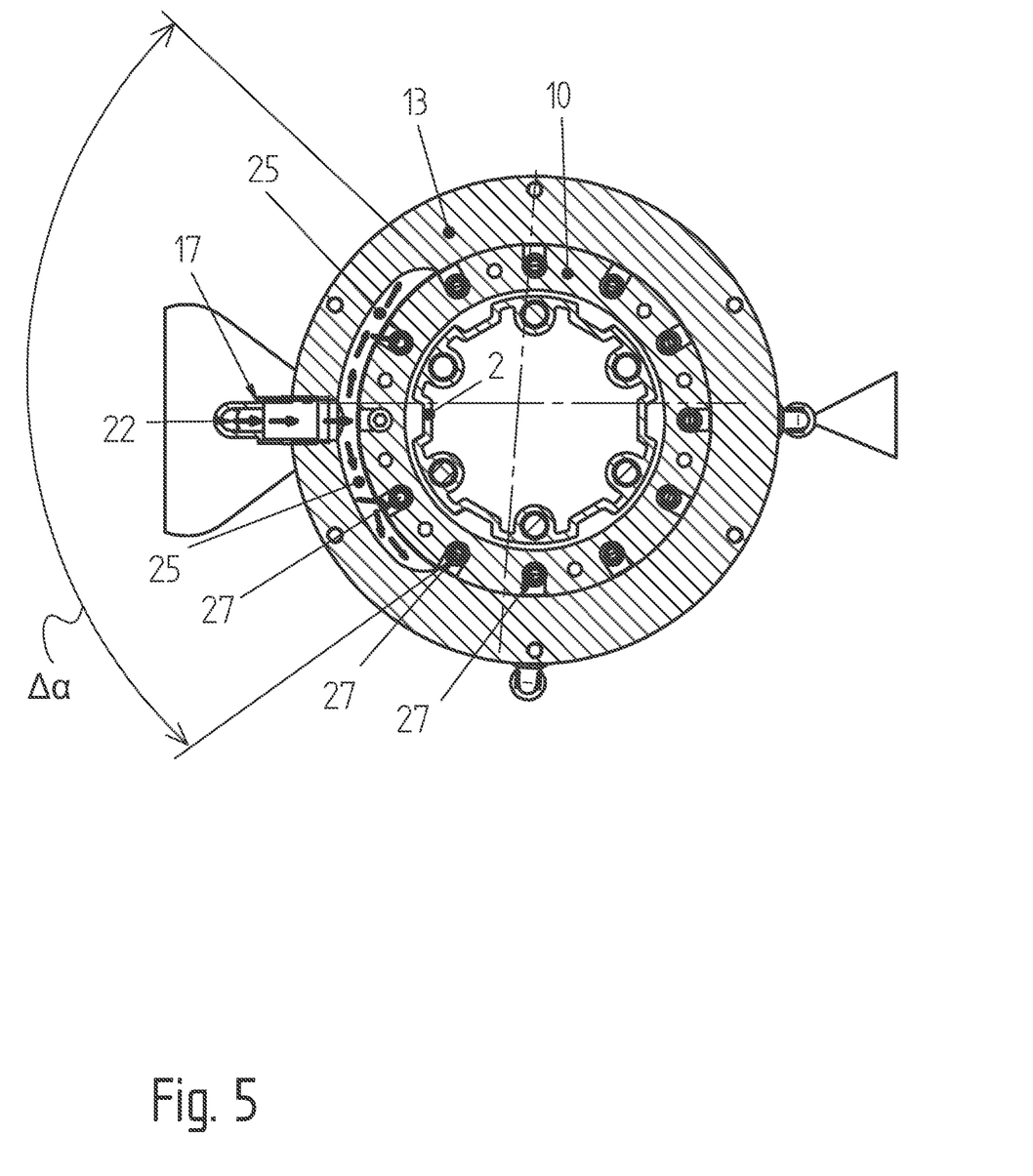
FIG. 5 shows a cross section through the embodiment example of the treatment apparatus according to the present invention shown in FIG. 4, and FIGS. 6-8 show the use of the embodiment example of the treatment apparatus according to the present invention in a car wash facility in various positions of the treatment facility relative to the vehicle with the vehicle surface to be cleaned.

As best illustrated in FIG. 5, a groove 25 is formed on the inside surface of the outer ring 13 or, more specifically, in the interior wall 14 of said outer ring (see FIG. 2). The groove 25 is formed by a recess in the interior wall 14. This groove is fluidically connected to the inlet opening 16 or, more specifically, to the hose coupling connector 17. A radial bore in the outer ring 13 therefor extends from the inlet opening 16 up to the groove 25. In the circumferential direction U (see FIG. 2) with respect to the axis of rotation D, the groove 25 extends over a limited circumferential angular range Δα of the outer ring 13. In the current embodiment example, the circumferential angular range Δα measures 120°. However, this circumferential angular range Δα can also be larger or smaller. However, it does not extend over the full circumferential angle of 360°. In the current embodiment example, the radial bore leads to the center of the groove 25. Thus, fluid 22 can flow from the outside into the groove 25 via the hose coupling connector 17, the inlet opening 16 and the radial bore in the outer ring 13. The outer ring 13 and, where appropriate, the hose coupling connector 17 are therefore also referred to as fluid supply device.

Figure 3:
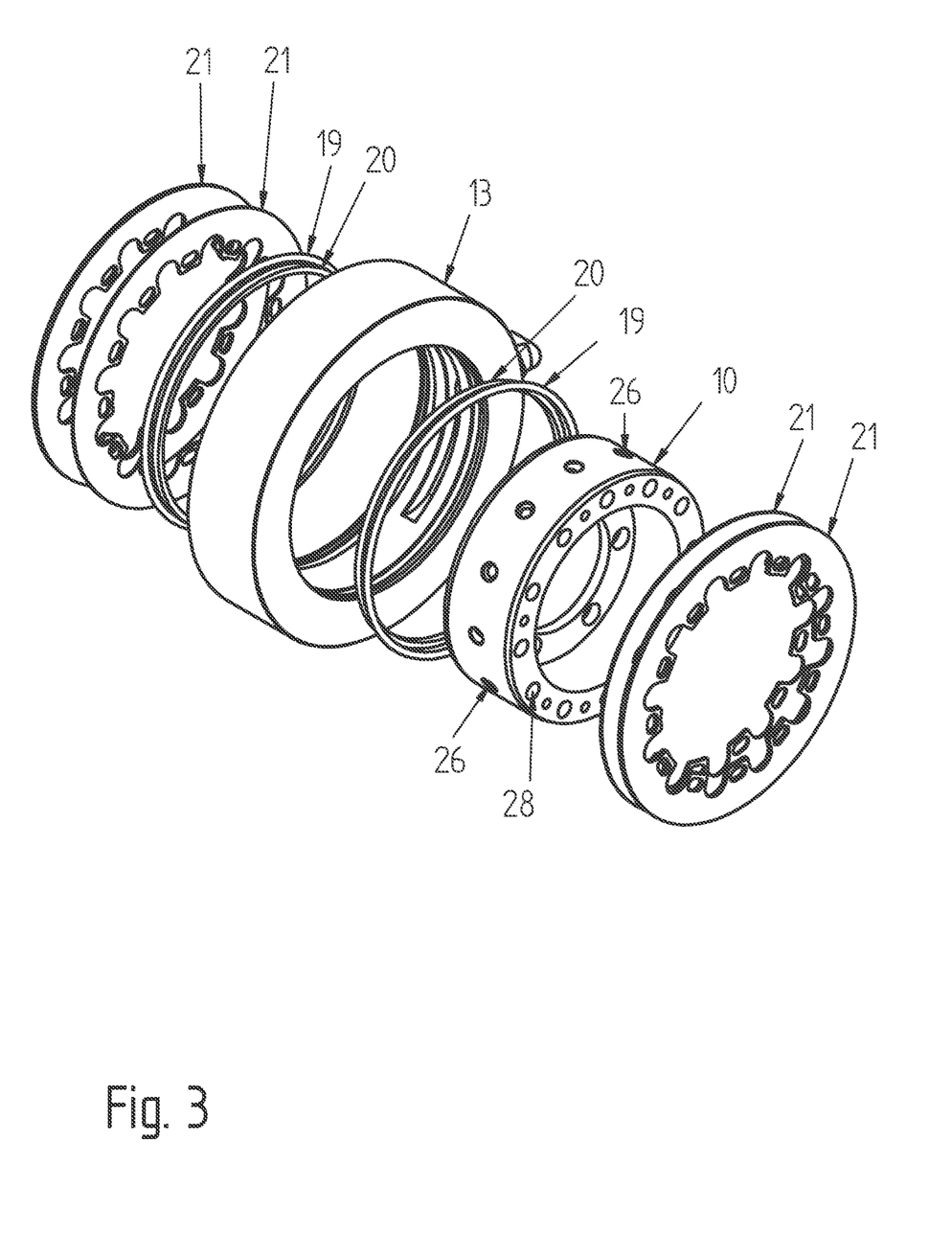
FIG. 3 shows an exploded view of the connection of the outer ring to the inner ring of the embodiment example of the treatment apparatus according to the present invention.

With reference to FIGS. 2 and 3, it will be explained how the pivotably mounted inner ring 10 is connected to the stationary, but adjustable outer ring 13. The inner ring 10 is torsionally rigidly inserted into the outer ring 13, so that the exterior wall 11 of the inner ring 10 touches the interior wall 14 of the outer ring 13. Disposed on both sides of the axis of the groove 25 are rotary seals 20 and O-rings 19, which prevent fluid from leaking from the groove 25 through the gap between the exterior wall 11 of the inner ring 10 and the interior wall 14 of the outer ring 13 to the outside. In addition, connecting rings 21 are provided so as to allow additional devices to be connected in the axial direction.

In the inner ring 10, a fluid channel section 27 is defined by two bores. One of the bores extends in the radial direction and opens into the opening 26 on the exterior wall 11 of the inner ring 10. The other bore associated therewith extends in a direction parallel to the axis of rotation D, i.e., in the axial direction, and opens into the opening 28 on the lower surface of the inner ring 10 (see FIG. 2). As is especially clearly illustrated in FIG. 5, a plurality of such fluid channel sections 27 are formed in the inner ring 10. However, the fluid channel sections 27 are separated from each other, i.e., they are not fluidically connected to each other.

As is best illustrated in FIG. 5, when the inner ring 10 and the outer ring 13 are assembled, a plurality of openings 26 of the fluid channel sections 27, irrespective of the angular position of the inner ring 10 relative to the outer ring 13 with respect to the axis of rotation D, are fluidically always connected to the groove 25; however, the openings 26 of other fluid channel sections 27 of the inner ring 10 are not fluidically connected to the groove 25, since the groove extends only over a limited circumferential angular range Δα of the outer ring 13. In the example shown in FIG. 5, three fluid channel sections 27 are fluidically connected to the groove 25, whereas nine fluid channel sections 27 are not fluidically connected to the groove 25. As FIG. 5 illustrates, fluid 22 is able to flow from the hose coupling connector 17 via the groove 25 into those fluid channel sections 27 of the inner ring 10 that are fluidically connected to the groove 25. If the inner ring 10 subsequently rotates relative to the outer ring 13, the groove 25 is fluidically connected to the other fluid channel sections 27 of the inner ring 10, which, upon rotation of the inner ring 10, creates a sequential rotary valve control system for supplying fluid to the fluid channel sections 27.

As is best illustrated in FIG. 4, the fluid 22, which has flowed from the groove 25 into a fluid channel section 27 of the inner ring 10, is subsequently conducted from said fluid channel section via the opening 28 on the lower surface of the inner ring 10 into a fluid channel section 30 in a brush ring segment 7. To this end, the brush ring segment 7 comprises a connecting piece 29 which is inserted into the associated opening 28. In the axial direction, additional brush ring segments 7 with the respective associated connecting pieces 29 follow, thereby creating the brush ring assembly 6 described above.

Figure 1:
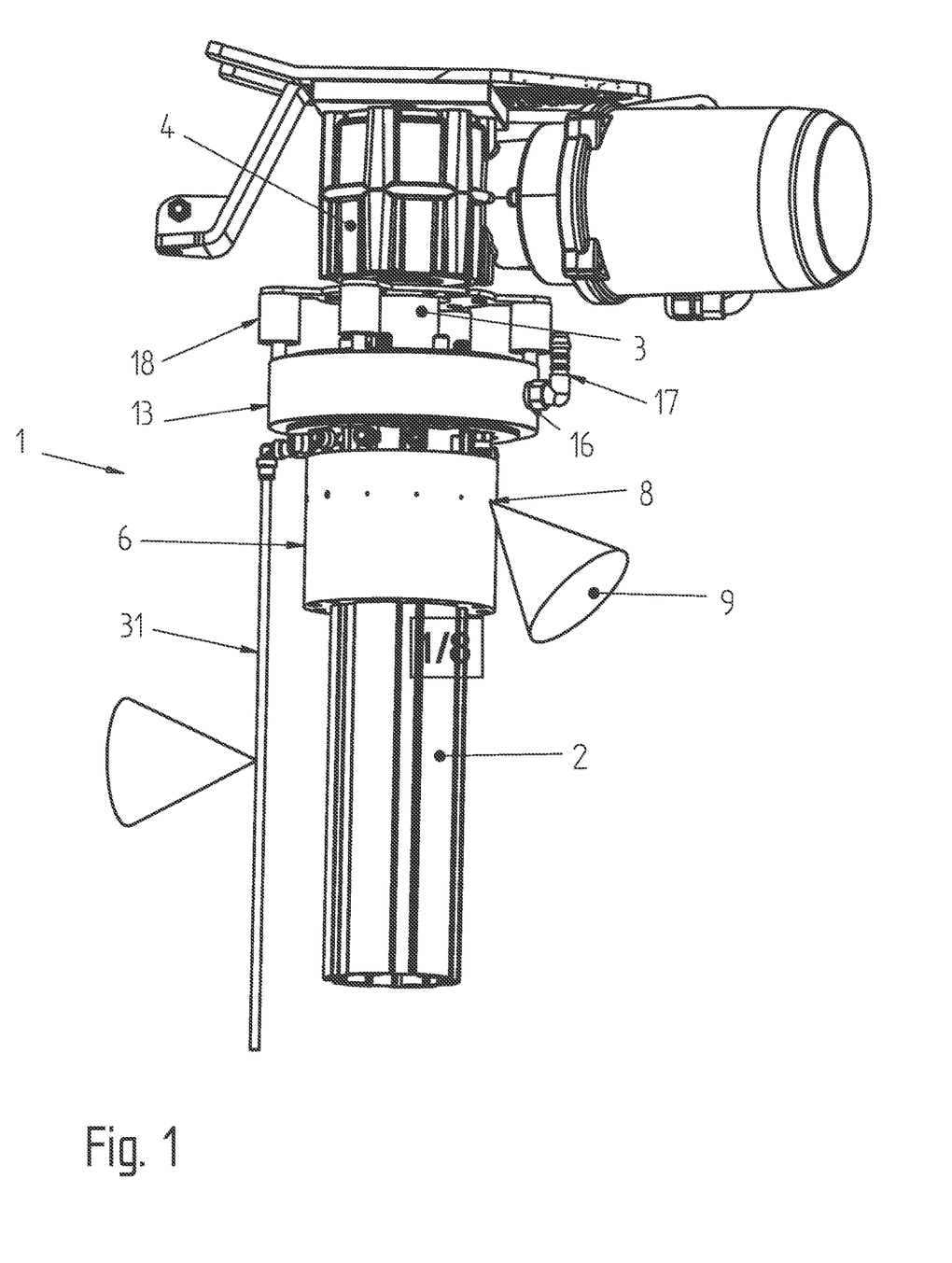
FIG. 1 shows a partial view of an embodiment example of the treatment apparatus according to the present invention.

Thus, the fluid channel sections 27 and 30 form a fluid channel. In this manner, a plurality of spaced-apart separate fluid channels is formed in the circumferential direction U. Each fluid channel, i.e., the fluid channel sections 30 of the brush ring segments 7, opens into a plurality of outlet openings 8, which, in the lengthwise direction of the brush ring assembly 6, are disposed at a distance from each other. In the current embodiment example, each brush ring segment 7 has an outlet opening 8 for each fluid channel section 30. Since the fluid channel sections 30 in circumferential direction U are distributed about the axis of rotation D, each brush ring segment 7 has exactly the same number of outlet openings 8 as there are fluid channel sections 30 in a brush ring segment 7, as can be seen in FIG. 1. The outlet openings 8 of a specific fluid channel section 30, which openings are disposed in the lengthwise direction of the brush ring assembly 6, are disposed at the same circumferential angle of the brush ring assembly 6. The outlet openings 8 of a respective other fluid channel section 30, on the other hand, are disposed at a circumferential angle of brush ring assembly 6 different from that of the outlet openings 8 of the one fluid channel section 30.

Thus, if fluid is supplied via the groove 25 to a specific fluid channel, this fluid exits at a specific circumferential angle with respect to the axis of rotation D only via the outlet openings 8. After fluid has been applied via the groove 25 at each angular position of the outer ring 13 relative to the inner ring 10 to a plurality of fluid channels, an ejection of fluid takes place within a specific limited circumferential angular range in the brush ring assembly 6. In the currently described embodiment example, this circumferential angular range for the ejection of fluid corresponds to the circumferential angular range Δα over which the groove 25 extends in the circumferential direction U. Even if the inner ring 10 and the brush ring assembly 6 rotate, the circumferential angular range, within which the fluid is ejected, does not change. However, because of the rotation of the brush ring assembly 6, fluid is ejected via various outlet openings. Thus, if treatment elements, in particular washing elements, are attached to the brush ring assembly 6 and radially extend away from this assembly, these elements are wetted with fluid 22 or, more specifically, with washing fluid, over the entire circumference, although the ejection of fluid always takes place only within a limited circumferential angular range.

In addition, provided on one side next to the brush ring assembly 6 is a conduit 31 which is connected to the fluid channel section 27 of the inner ring 10, as illustrated in the current embodiment example. The conduit involved here can be a single conduit 31. However, a separate conduit 31 can conceivably be connected to each separate fluid channel section 27. The conduit 31 in turn has a plurality of outlet openings, which, in the lengthwise direction, are disposed at a distance from each other. As an alternative or in addition to the fluid channel sections 30, the conduit 31 can be disposed in the brush ring segment 7. In the absence of a fluid channel section 30 in the brush ring segment 7, the conduits 31 assume the function of these fluid channel sections 30. In that case, the separate conduits 31 are disposed at different circumferential angles around the brush ring assembly 6. These conduits also eject the fluid radially outwardly into a specific spatial angular range, so that they, too, are able to wet the treatment or washing elements from the inside out.

Figure 6:
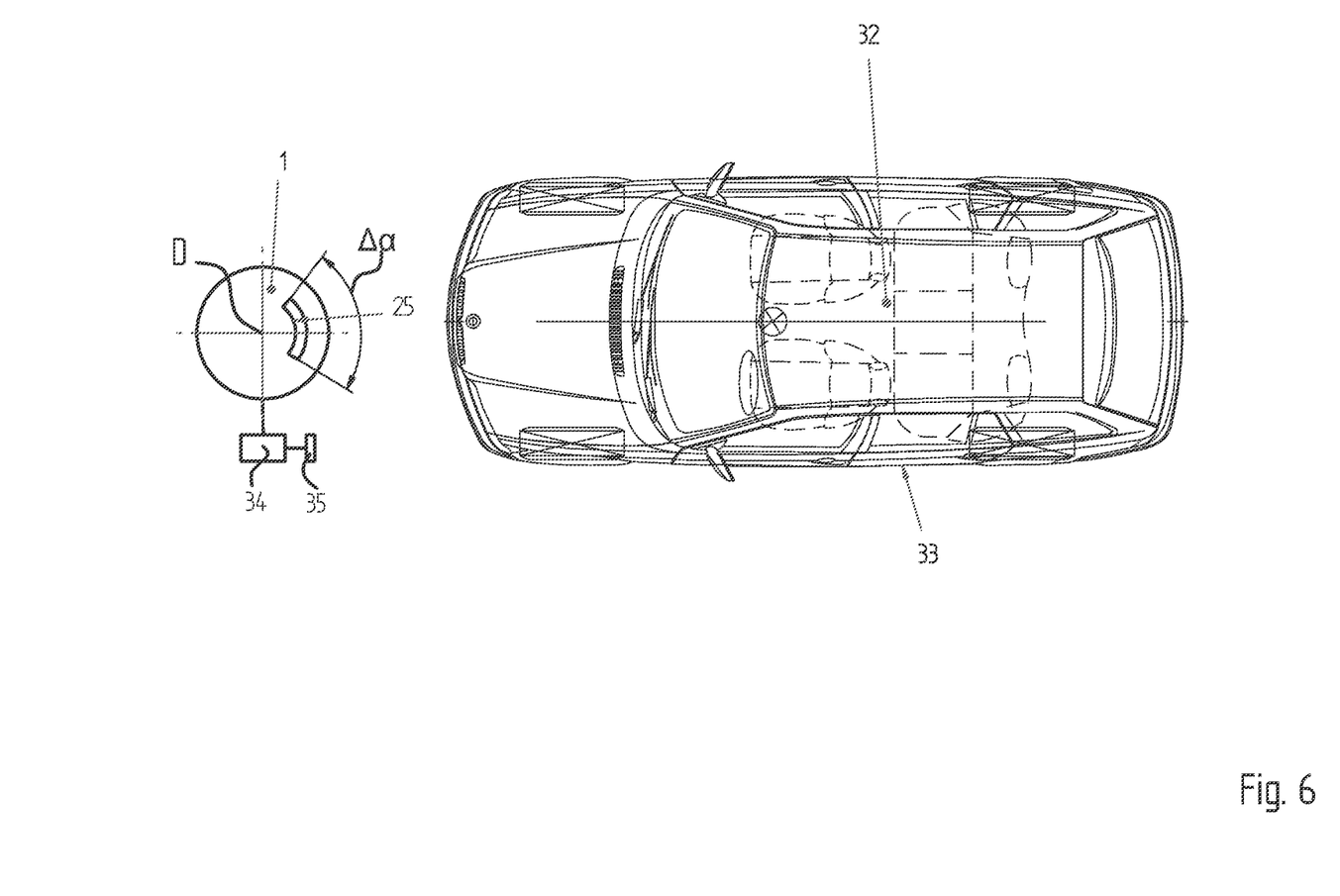
Figure 7:
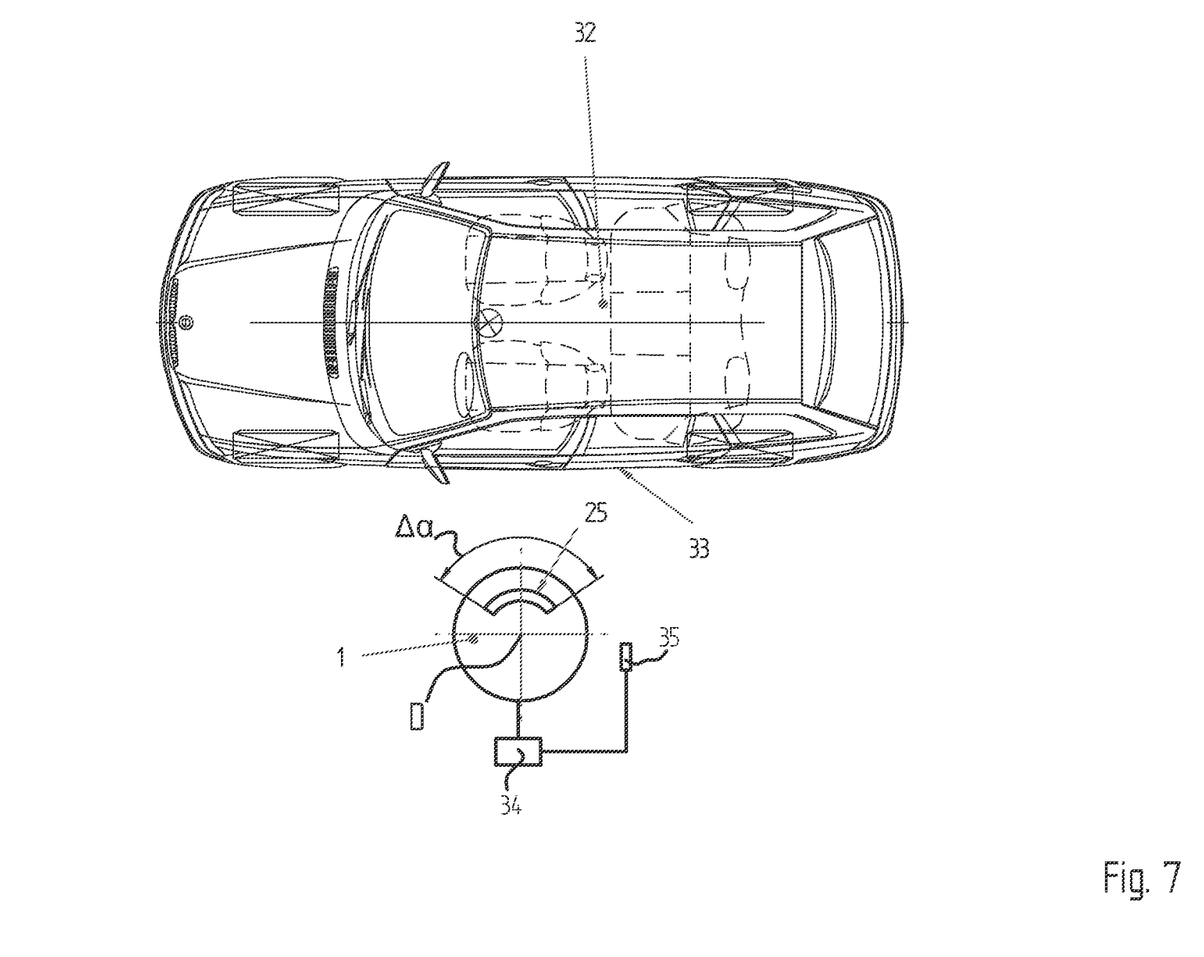
Figure 8:
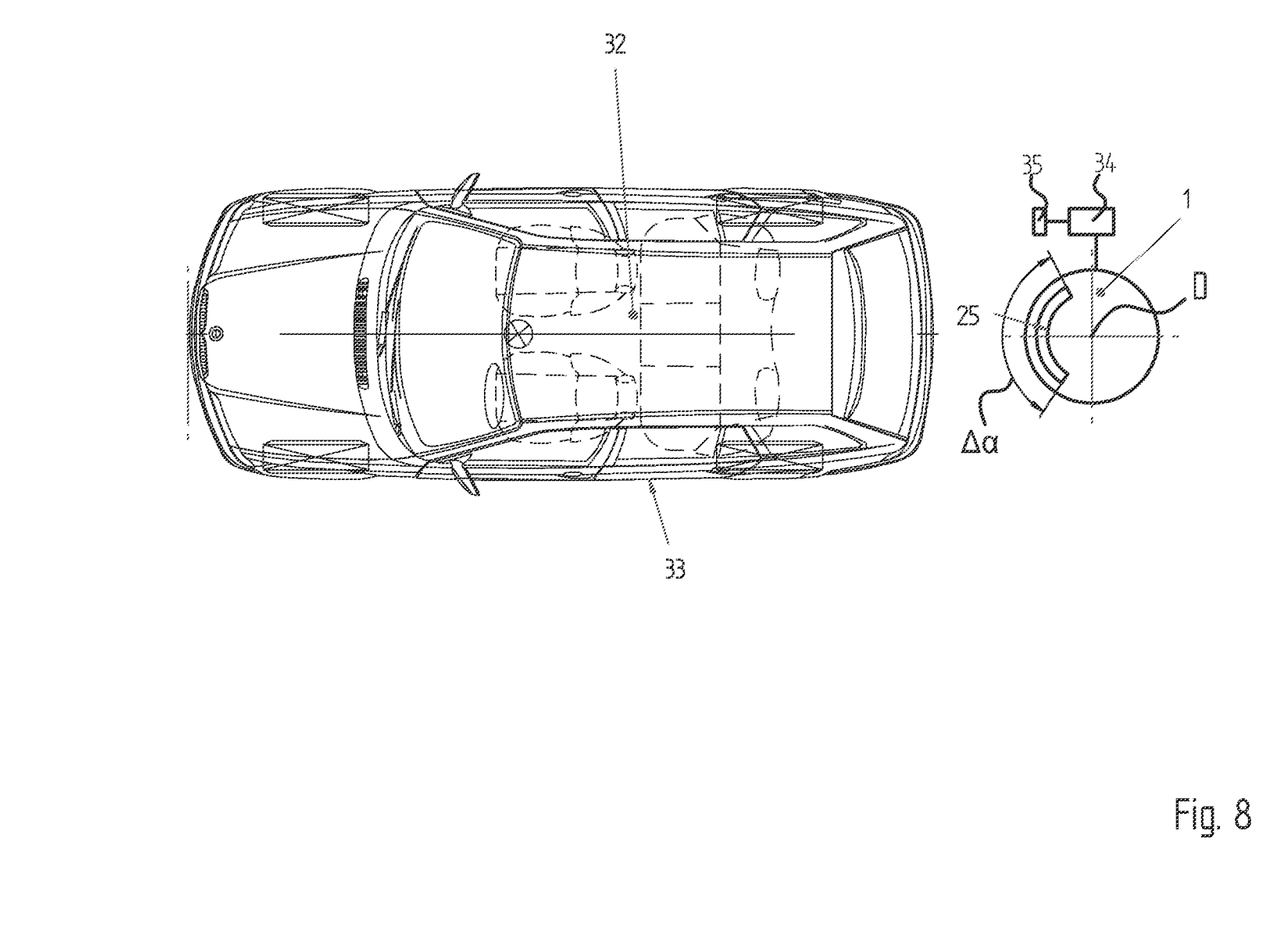

With reference to FIGS. 6 to 8, the method according to the present invention used for treating a vehicle surface with a fluid will be described based on an embodiment example.

Using the method described in this embodiment example, a vehicle surface 33 of a vehicle 32 is treated by means of the treatment apparatus 1 described above. The vehicle 32 can be located, for example, in a car wash facility which comprises the treatment apparatus 1. For this purpose, the treatment apparatus 1 is connected to a control unit 34 which is able to actuate the motor 3 of the treatment apparatus, so as to set the motor shaft 3, and thus the brush shaft 2 together with the brush ring assembly 6, in rotation. In addition, the control unit 34 is connected to the fixing elements 18. This control unit can actuate the fixing elements 18 in such a manner that the angular position of the outer ring 13, and thus the angular position of the groove 25 relative to the axis of rotation D, can be changed. Thus, the angular position of the groove 25 relative to the vehicle 32 can be changed. An additional motor (not shown) can be provided for this purpose. The control unit 34 is furthermore connected to a sensor 35, known in the art, which detects the position of the vehicle surface 33 to be cleaned relative to the treatment apparatus 1 and transmits it to the control unit 34.

According to the method described by this invention, first the rotation device, i.e., the brush shaft 2, the brush ring assembly 6 and the inner ring 10, is set in rotation by means of the motor shaft 3. Next, fluid 22, for example, a washing fluid, is supplied via the hose coupling connector 17 to the outer ring 13. As described above, the fluid 22 is subsequently ejected via the outlet openings 8 into an angular range which corresponds to the circumferential angular range Δα of the groove 25. Thus, in the position of the groove 25 relative to the vehicle 32, as shown in FIG. 6, the fluid 22 is ejected toward the front of the vehicle 32.

As shown in FIGS. 7 and 8, in the course of the treatment procedure, the position of the treatment apparatus 1 relative to the vehicle 32 changes. Of foremost importance during this change of position is above all the angular position of the treatment apparatus 1 relative to the vehicle surface 33 to be cleaned. This angular position is detected by the sensor 35 and transmitted to the control unit 34. As shown in FIGS. 7 and 8, the control unit 34 changes the angular position of the groove 25 of the outer ring 13 with respect to the axis of rotation D as a function of said angular position. In that case, the circumferential angular range Δα of the groove 25 is always directed in the direction of the vehicle surface 33 to be treated, so that in this circumferential angular range, the fluid 22 is again ejected in the direction of the vehicle surface 33.

LIST OF REFERENCE CHARACTERS

1 Treatment apparatus
2 Brush shaft
3 Motor shaft
4 Motor
5 Screws
6 Brush ring assembly
7 Brush ring segments
8 Outlet openings
9 Fluid jet
10 Inner ring
11 Exterior wall of the inner ring
12 Interior wall of the inner ring
13 Outer ring
14 Interior wall of the outer ring
15 Exterior wall of the outer ring
16 Inlet opening
17 Hose coupling connector
18 Fixing elements
19 O-rings
20 Rotary seals
21 Connecting rings
22 Fluid
23 Radial bore in the outer ring
24 Metal lining
25 Groove
26 Openings
27 Fluid channel section in the inner ring
28 Openings
29 Connecting piece of a brush ring segment
30 Fluid channel section in the brush ring segment
31 Conduit
32 Vehicle
33 Vehicle surface
34 Control unit
35 Sensor
D Axis of rotation
U Circumferential direction relative to the axis of rotation D

The invention claimed is:

1. An apparatus for treating a vehicle surface with a fluid, the apparatus comprising
a rotation device pivotably mounted about an axis of rotation and
a fluid supply device disposed concentrically with respect to the rotation device and having an inlet opening for the supply of fluid, wherein
a groove is formed in the fluid supply device, said groove fluidically connected to the inlet opening and extending in the circumferential direction with respect to the axis of rotation over a limited circumferential angular range of the fluid supply device, and
the rotation device has a plurality of separate fluid channels, each of which opens into openings, said openings disposed in such a manner that, irrespective of the angular position of the rotation device to the fluid supply device with respect to the axis of rotation, at least one of the openings of the rotation device is fluidically connected to the groove of the fluid supply device.

2. The apparatus of claim 1, wherein
each fluid channel connects the associated opening of the rotation device to a plurality of outlet openings which are disposed at a distance from each other in the lengthwise direction of the rotation device, with the outlet openings of one fluid channel being disposed at essentially the same circumferential angle of the rotation device and with the outlet openings of another fluid channel being disposed at a circumferential angle of the rotation device different from that of the outlet openings of the one fluid channel.

3. The apparatus of claim 1, wherein
the fluid supply device comprises an outer ring which has a rotationally symmetrical interior wall, and
wherein the groove is formed in the rotationally symmetrical interior wall.

4. The apparatus of claim 3,
the groove in the rotationally symmetrical interior wall extends over a circumferential angle which is in a range of 20° to 180°.

5. The apparatus of claim 3, wherein
the rotation device comprises an inner ring which has a rotationally symmetrical exterior wall which adjoins the rotationally symmetrical interior wall of the outer ring, and
wherein the openings of the rotation device in the circumferential direction are disposed in the rotationally symmetrical exterior wall.

6. The apparatus of claim 5,
each fluid channel extends from the associated opening radially into the inner ring and subsequently runs in the lengthwise direction of the rotation device to the outlet openings.

7. The apparatus of claim 5,
the rotation device comprises a brush shaft and a brush ring assembly,
wherein the brush ring assembly is disposed concentrically relative to, on the exterior of, and torsionally rigidly to the brush shaft,
wherein treatment elements are attached to the brush ring assembly,
wherein each fluid channel comprises a section extending within the inner ring and a section extending within the brush ring assembly, and
wherein the outlet openings are formed in the brush ring assembly.

8. The apparatus of claim 2, wherein
the outlet openings are designed in such a manner that the fluid is sprayed in a fluid jet into a spatial angle which is in a range of 0° to 15°, and/or the center line of the sprayed fluid jet forms an angle with the axis of rotation, which is in a range of 40° to 90°.

9. The apparatus of claim 7, wherein
the brush ring assembly comprises a plurality of brush ring segments which are attached to the brush shaft in the lengthwise direction of the rotation device and which are connected to each other.

10. The apparatus of claim 5, wherein
the inner ring and the outer ring are made of the same material.

11. The apparatus of claim 5, wherein
the rotation device is torsionally rigidly connected to at least one metal liner which is connected to a motor shaft and which is engaged in the inner ring.

12. The apparatus of claim 1, wherein
the angular position of the fluid supply device with respect to the axis of rotation can be adjusted.

13. A method for treating a vehicle surface with a fluid by a treatment apparatus that comprises a rotation device with separate fluid channels, which is pivotably mounted about an axis of rotation, and a fluid supply device which is disposed concentrically relative to the rotation device, the method comprising:
supplying fluid via an inlet opening to the fluid supply device,
conducting the fluid in the fluid supply device from the inlet opening into a groove which is fluidically connected to the inlet opening and which, in the circumferential direction with respect to the axis of rotation, extends over a limited circumferential angular range of the fluid supply device, and
supplying the fluid to the rotating rotation device, with the fluid being supplied from the groove to a subset of the fluid channels, with openings of the fluid channels being disposed in such a way that, irrespective of the angular position of the rotation device to the fluid supply device with respect to the axis of rotation, at least one opening is fluidically connected to the groove of the fluid supply device.

14. The method of claim 13, wherein
the fluid is supplied by one of the fluid channels to a plurality of outlet openings of the rotation device and is sprayed out of the outlet openings, with the outlet openings of a fluid channel in the lengthwise direction of the rotation device being disposed at a distance from each other, with the outlet openings of each fluid channel being disposed at essentially the same circumferential angle of the rotation device and with the outlet openings of another fluid channel being disposed at a circumferential angle of the rotation device different from that of the outlet openings of the one fluid channel.

15. The method of claim 13, wherein
the angular position of the treatment apparatus relative to a vehicle surface to be cleaned is detected, and the angular position of the groove of the fluid supply device with respect to the axis of rotation is adjusted as a function of the detected angular position of the treatment apparatus relative to the vehicle surface to be cleaned.

* * * * *